United States Patent
Kajimura et al.

(10) Patent No.: US 10,937,194 B2
(45) Date of Patent: Mar. 2, 2021

(54) IMAGE PROCESSING APPARATUS, IMAGE PROCESSING METHOD, AND IMAGE PROCESSING PROGRAM

(71) Applicant: SHARP KABUSHIKI KAISHA, Sakai (JP)

(72) Inventors: Akihiro Kajimura, Sakai (JP); Masayuki Yamaguchi, Sakai (JP); Mitsuhisa Ohnishi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 86 days.

(21) Appl. No.: 16/285,894

(22) Filed: Feb. 26, 2019

(65) Prior Publication Data

US 2019/0266757 A1 Aug. 29, 2019

(30) Foreign Application Priority Data

Feb. 27, 2018 (JP) .............................. JP2018-033045

(51) Int. Cl.
*G06T 9/00* (2006.01)
*G06T 3/40* (2006.01)
(Continued)

(52) U.S. Cl.
CPC ................. *G06T 9/00* (2013.01); *G06T 3/40* (2013.01); *G06T 7/11* (2017.01); *G06T 7/74* (2017.01);
(Continued)

(58) Field of Classification Search
CPC .... G06T 9/00; G06T 3/40; G06T 7/90; G06T 7/11; G06T 7/74; G06T 2207/20224;
(Continued)

(56) References Cited

U.S. PATENT DOCUMENTS 5,956,431 A 9/1999 Iourcha et al.
6,807,300 B1 * 10/2004 Gindele ..................... G06T 5/20
382/167

(Continued)

FOREIGN PATENT DOCUMENTS

JP 2001-519608 A 10/2001
TW 476921 B 2/2002
WO 2006/126949 A1 11/2006

*Primary Examiner* — Nimesh Patel
(74) *Attorney, Agent, or Firm* — ScienBiziP, P.C.

(57) ABSTRACT

An image processing apparatus of the disclosure includes: a blocking unit configured to divide image information into blocks; a map information acquisition unit configured to acquire at least one piece of map information in which pieces of reference pixel information and pieces of positional information are associated with a target pixel in each of the blocks, the pieces of reference pixel information denoting at least one reference pixel referenced by the target pixel, each of the pieces of positional information denoting a positional relationship between the target pixel and the at least one reference pixel; and a reference pixel information selecting unit configured to select one piece of reference pixel information of the pieces of reference pixel information included in the at least one piece of map information based on a pixel value of the target pixel and a pixel value of the at least one reference pixel.

15 Claims, 11 Drawing Sheets

(51) Int. Cl.
*G06T 7/90* (2017.01)
*G06T 7/11* (2017.01)
*G06T 7/73* (2017.01)

(52) U.S. Cl.
CPC ...... *G06T 7/90* (2017.01); *G06T 2207/20021* (2013.01); *G06T 2207/20224* (2013.01)

(58) Field of Classification Search
CPC ........... G06T 2207/20021; G06T 5/002; G06T 2207/10024; G06T 7/593; G06T 2207/10016; G06T 5/20; G06T 2207/10012; G06T 7/0012; G06T 5/005; G06T 5/50; G06T 2207/30252; G06T 5/00; G06T 5/003; G06T 7/73; G06T 2207/10028; G06T 7/001; G06T 11/001; G06T 19/20; G06T 2207/20084; G06T 2207/20221; G06T 5/001; G06T 7/00; G06T 2207/20081; H04N 19/124; H04N 19/176; H04N 19/105; H04N 19/593; H04N 19/182; H04N 19/52; H04N 19/513; H04N 19/61; H04N 1/415; H04N 13/128; H04N 19/103; H04N 19/142; G06K 9/4604; G06K 9/6202; G06K 9/00147; G06K 15/1871; G06K 9/00805; G06K 9/6203; G06K 9/00624; G06K 9/00791; G06K 9/00798; G06K 9/3241; G06K 9/44; G06K 9/46; G06K 9/6255; G06K 2009/4666; G06K 9/2054; G06K 9/3275; G09G 2320/0261; G09G 2320/0271; G09G 2320/103; G09G 2340/0428; G09G 2340/0435; G09G 2340/16; G09G 2360/16; G09G 2360/18; G09G 3/20; G09G 3/2025; G09G 5/02; A61B 8/0825; A61B 5/0037; A61B 6/032; A61B 6/4417; A61B 6/502; A61B 6/5235; A61B 6/5247; A61B 8/03; A61B 8/4245; A61B 8/4416; A61B 8/463; A61B 8/5246; A61B 8/5261

See application file for complete search history.

(56) References Cited

U.S. PATENT DOCUMENTS

| | | | | |
|---|---|---|---|---|
| 2003/0053706 | A1* | 3/2003 | Hong | H04N 19/176 |
| | | | | 382/253 |
| 2004/0151372 | A1* | 8/2004 | Reshetov | G06T 11/001 |
| | | | | 382/166 |
| 2011/0299795 | A1* | 12/2011 | Shibata | G06T 3/4053 |
| | | | | 382/294 |
| 2020/0211167 | A1* | 7/2020 | Lee | G06T 3/4007 |

* cited by examiner

| P0 | P1 | P2 | P3 |
| --- | --- | --- | --- |
| P4 | P5 | P6 | P7 |
| P8 | P9 | P10 | P11 |
| P12 | P13 | P14 | P15 |

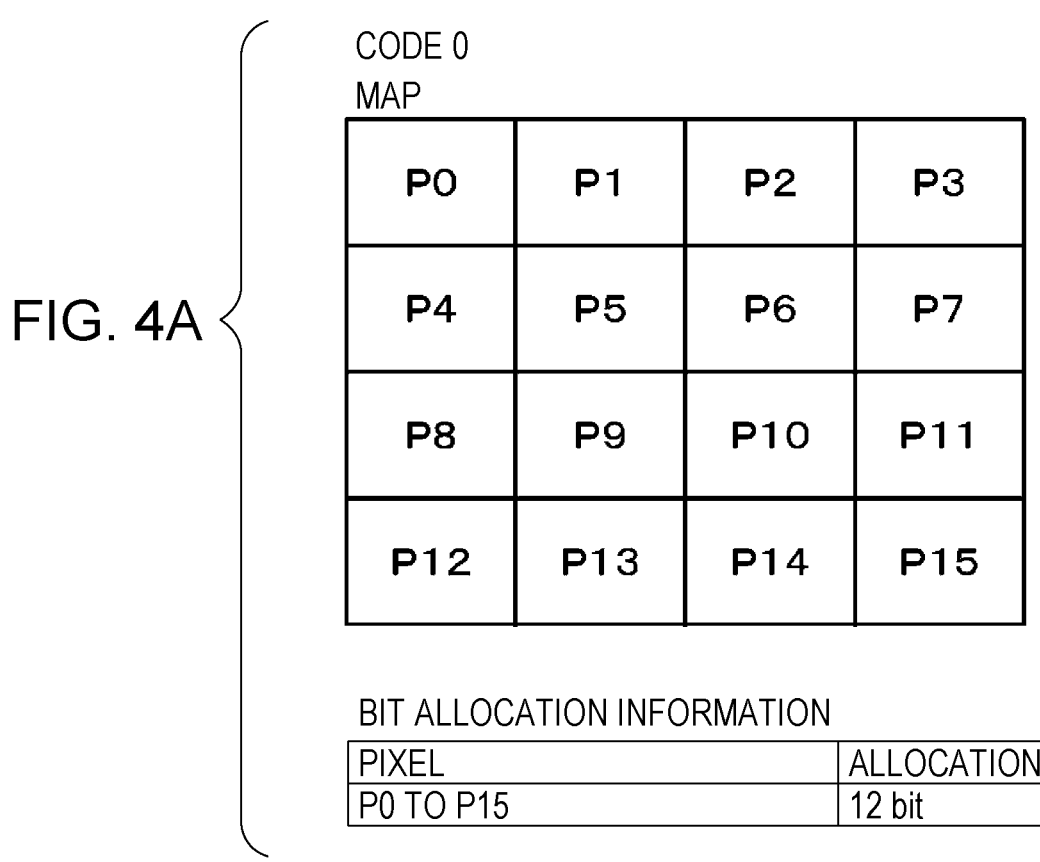

FIG. 4B

CODE 1

MAP

| P0 | P1 | P2 | P3 |
|---|---|---|---|
| P4 | Q1 | Q2 | P7 |
| P8 | Q3 | Q4 | P11 |
| P12 | P13 | P14 | P15 |

MODE INFORMATION

| TARGET PIXEL | REFERENCE PIXEL | MODE |
|---|---|---|
| Q1 | P1 | DIRECT REFERENCE |
|  | P4 | DIRECT REFERENCE |
|  | P1, P13 | INTERNAL DIVISION OF 1:2 |
|  | P4, P7 | INTERNAL DIVISION OF 1:2 |
| Q2 | P2 | DIRECT REFERENCE |
|  | P7 | DIRECT REFERENCE |
|  | P2, P14 | INTERNAL DIVISION OF 1:2 |
|  | P7, P4 | INTERNAL DIVISION OF 1:2 |
| Q3 | P8 | DIRECT REFERENCE |
|  | P13 | DIRECT REFERENCE |
|  | P8, P11 | INTERNAL DIVISION OF 1:2 |
|  | P13, P1 | INTERNAL DIVISION OF 1:2 |
| Q4 | P11 | DIRECT REFERENCE |
|  | P14 | DIRECT REFERENCE |
|  | P11, P8 | INTERNAL DIVISION OF 1:2 |
|  | P14, P2 | INTERNAL DIVISION OF 1:2 |

BIT ALLOCATION INFORMATION

| PIXEL | ALLOCATION BIT |
|---|---|
| P0 TO P4, P7, P8, P11 TO P15 | 15 bit |
| Q1 TO Q4 | 2 bit |

FIG. 4C

CODE 2

MAP:

| Q5 | P1 | P2 | Q6 |
| P4 | P5 | P6 | P7 |
| P8 | P9 | P10 | P11 |
| Q7 | P13 | P14 | Q8 |

MODE INFORMATION

| TARGET PIXEL | REFERENCE PIXEL | MODE |
|---|---|---|
| Q5 | P1 | DIRECT REFERENCE |
|  | P4 | DIRECT REFERENCE |
|  | P5 | DIRECT REFERENCE |
| Q6 | P2 | DIRECT REFERENCE |
|  | P6 | DIRECT REFERENCE |
|  | P7 | DIRECT REFERENCE |
| Q7 | P8 | DIRECT REFERENCE |
|  | P9 | DIRECT REFERENCE |
|  | P13 | DIRECT REFERENCE |
| Q8 | P10 | DIRECT REFERENCE |
|  | P11 | DIRECT REFERENCE |
|  | P14 | DIRECT REFERENCE |

BIT ALLOCATION INFORMATION

| PIXEL | ALLOCATION BIT |
|---|---|
| P1, P2, P4 TO P11, P13, P14 | 15 bit |
| Q5 TO Q8 | 2 bit |

FIG. 4D

CODE 3

MAP

| | | | |
|---|---|---|---|
| P0 | Q9 | P2 | P3 |
| P4 | P5 | P6 | Q10 |
| Q11 | P9 | P10 | P11 |
| P12 | P13 | Q12 | P15 |

MODE INFORMATION

| TARGET PIXEL | REFERENCE PIXEL | MODE |
|---|---|---|
| Q9 | P0 | DIRECT REFERENCE |
| | P2 | DIRECT REFERENCE |
| | P5 | DIRECT REFERENCE |
| | P0, P2 | INTERNAL DIVISION OF 1:1 |
| Q10 | P3 | DIRECT REFERENCE |
| | P6 | DIRECT REFERENCE |
| | P11 | DIRECT REFERENCE |
| | P3, P11 | INTERNAL DIVISION OF 1:1 |
| Q11 | P4 | DIRECT REFERENCE |
| | P9 | DIRECT REFERENCE |
| | P12 | DIRECT REFERENCE |
| | P4, P12 | INTERNAL DIVISION OF 1:1 |
| Q12 | P10 | DIRECT REFERENCE |
| | P13 | DIRECT REFERENCE |
| | P15 | DIRECT REFERENCE |
| | P13, P15 | INTERNAL DIVISION OF 1:1 |

BIT ALLOCATION INFORMATION

| PIXEL | ALLOCATION BIT |
|---|---|
| P0, P2 TO P6, P9 TO 13, P15 | 15 bit |
| Q9 TO Q12 | 2 bit |

FIG. 4E

CODE 4

MAP

| P0 | P1 | P5 | P9 | Q16 |
| Q14 | | | | |
| P8 | | | | |
| P12 | | | | |



| P0 | Q14 | P8 | P12 |
|---|---|---|---|
| P1 | P5 | P9 | Q16 |
| Q13 | P6 | P10 | P14 |
| P3 | P7 | Q15 | P15 |

MODE INFORMATION

| TARGET PIXEL | REFERENCE PIXEL | MODE |
|---|---|---|
| Q13 | P1 | DIRECT REFERENCE |
| | P3 | DIRECT REFERENCE |
| | P6 | DIRECT REFERENCE |
| | P1, P3 | INTERNAL DIVISION OF 1:1 |
| Q14 | P0 | DIRECT REFERENCE |
| | P5 | DIRECT REFERENCE |
| | P8 | DIRECT REFERENCE |
| | P0, P8 | INTERNAL DIVISION OF 1:1 |
| Q15 | P7 | DIRECT REFERENCE |
| | P10 | DIRECT REFERENCE |
| | P15 | DIRECT REFERENCE |
| | P7, P15 | INTERNAL DIVISION OF 1:1 |
| Q16 | P9 | DIRECT REFERENCE |
| | P12 | DIRECT REFERENCE |
| | P14 | DIRECT REFERENCE |
| | P12, P14 | INTERNAL DIVISION OF 1:1 |

BIT ALLOCATION INFORMATION

| PIXEL | ALLOCATION BIT |
|---|---|
| P0 TO P4, P7, P8, P11 TO P15 | 15 bit |
| Q13 TO Q16 | 2 bit |

FIG. 4F

CODE 5

MODE INFORMATION

| TARGET PIXEL | REFERENCE PIXEL | MODE |
|---|---|---|
| Q17 | P0 | DIRECT REFERENCE |
|  | P3 | DIRECT REFERENCE |
|  | P5 | DIRECT REFERENCE |
|  | P0, P3 | INTERNAL DIVISION OF 1:2 |
| Q18 | P0 | DIRECT REFERENCE |
|  | P3 | DIRECT REFERENCE |
|  | P5 | DIRECT REFERENCE |
|  | P3, P0 | INTERNAL DIVISION OF 1:2 |
| Q19 | P0 | DIRECT REFERENCE |
|  | P5 | DIRECT REFERENCE |
|  | P12 | DIRECT REFERENCE |
|  | P0, P12 | INTERNAL DIVISION OF 1:2 |
| Q20 | P3 | DIRECT REFERENCE |
|  | P6 | DIRECT REFERENCE |
|  | P15 | DIRECT REFERENCE |
|  | P3, P15 | INTERNAL DIVISION OF 1:2 |
| Q21 | P0 | DIRECT REFERENCE |
|  | P9 | DIRECT REFERENCE |
|  | P12 | DIRECT REFERENCE |
|  | P12, P0 | INTERNAL DIVISION OF 1:2 |
| Q22 | P0 | DIRECT REFERENCE |
|  | P5 | DIRECT REFERENCE |
|  | P12 | DIRECT REFERENCE |
|  | P0, P12 | INTERNAL DIVISION OF 1:2 |
| Q23 | P0 | DIRECT REFERENCE |
|  | P5 | DIRECT REFERENCE |
|  | P12 | DIRECT REFERENCE |
|  | P0, P12 | INTERNAL DIVISION OF 1:2 |
| Q24 | P0 | DIRECT REFERENCE |
|  | P5 | DIRECT REFERENCE |
|  | P12 | DIRECT REFERENCE |
|  | P0, P12 | INTERNAL DIVISION OF 1:2 |

MAP

| P0  | Q17 | Q18 | P3  |
|-----|-----|-----|-----|
| Q19 | P5  | P6  | Q20 |
| Q21 | P9  | P10 | Q22 |
| P12 | Q23 | Q24 | P15 |

BIT ALLOCATION INFORMATION

| PIXEL | ALLOCATION BIT |
|---|---|
| P0, P3, P5, P6, P9, P10, P12, P15 | 22 bit |
| Q17 TO Q24 | 2 bit |

FIG. 4G

CODE 6

| TARGET PIXEL | REFERENCE PIXEL | MODE |
|---|---|---|
| Q25 | P1 | DIRECT REFERENCE |
| | P4 | DIRECT REFERENCE |
| | P1, P4 | INTERNAL DIVISION OF 1:1 |
| | P3, P12 | INTERNAL DIVISION OF 1:1 |
| Q26 | P1 | DIRECT REFERENCE |
| | P3 | DIRECT REFERENCE |
| | P6 | DIRECT REFERENCE |
| | P1, P3 | INTERNAL DIVISION OF 1:1 |
| Q27 | P1 | DIRECT REFERENCE |
| | P4 | DIRECT REFERENCE |
| | P6 | DIRECT REFERENCE |
| | P9 | DIRECT REFERENCE |
| Q28 | P3 | DIRECT REFERENCE |
| | P6 | DIRECT REFERENCE |
| | P11 | DIRECT REFERENCE |
| | P3, P11 | INTERNAL DIVISION OF 1:1 |
| Q29 | P4 | DIRECT REFERENCE |
| | P9 | DIRECT REFERENCE |
| | P12 | DIRECT REFERENCE |
| | P4, P12 | INTERNAL DIVISION OF 1:1 |
| Q30 | P6 | DIRECT REFERENCE |
| | P9 | DIRECT REFERENCE |
| | P11 | DIRECT REFERENCE |
| | P14 | DIRECT REFERENCE |
| Q31 | P9 | DIRECT REFERENCE |
| | P12 | DIRECT REFERENCE |
| | P14 | DIRECT REFERENCE |
| | P12, P14 | INTERNAL DIVISION OF 1:1 |
| Q32 | P11 | DIRECT REFERENCE |
| | P14 | DIRECT REFERENCE |
| | P11, P14 | INTERNAL DIVISION OF 1:1 |
| | P3, P12 | INTERNAL DIVISION OF 1:1 |

MAP

| Q25 | P1 | Q26 | P3 |
|---|---|---|---|
| P4 | Q27 | P6 | Q28 |
| Q29 | P9 | Q30 | P11 |
| P12 | Q31 | P14 | Q32 |

BIT ALLOCATION INFORMATION

| PIXEL | ALLOCATION BIT |
|---|---|
| P1, P3, P4, P6, P9, P11, P12, P14 | 22 bit |
| Q25 TO Q32 | 2 bit |

FIG. 4H

CODE 7

MODE INFORMATION

| TARGET PIXEL | REFERENCE PIXEL | MODE |
|---|---|---|
| | P0 | DIRECT REFERENCE |
| Q33 | P2 | DIRECT REFERENCE |
| | P5 | DIRECT REFERENCE |
| | P0, P2 | INTERNAL DIVISION OF 1:1 |
| Q34 | P2 | DIRECT REFERENCE |
| | P7 | DIRECT REFERENCE |
| | P2, P4 | INTERNAL DIVISION OF 1:1 |
| | P0, P15 | INTERNAL DIVISION OF 1:1 |
| Q35 | P0 | DIRECT REFERENCE |
| | P5 | DIRECT REFERENCE |
| | P8 | DIRECT REFERENCE |
| | P0, P8 | INTERNAL DIVISION OF 1:1 |
| Q36 | P2 | DIRECT REFERENCE |
| | P5 | DIRECT REFERENCE |
| | P7 | DIRECT REFERENCE |
| | P10 | DIRECT REFERENCE |
| Q37 | P5 | DIRECT REFERENCE |
| | P8 | DIRECT REFERENCE |
| | P10 | DIRECT REFERENCE |
| | P13 | DIRECT REFERENCE |
| Q38 | P7 | DIRECT REFERENCE |
| | P10 | DIRECT REFERENCE |
| | P15 | DIRECT REFERENCE |
| | P17, P15 | INTERNAL DIVISION OF 1:1 |
| Q39 | P8 | DIRECT REFERENCE |
| | P13 | DIRECT REFERENCE |
| | P18, P13 | INTERNAL DIVISION OF 1:1 |
| | P0, P15 | INTERNAL DIVISION OF 1:1 |
| Q40 | P10 | DIRECT REFERENCE |
| | P13 | DIRECT REFERENCE |
| | P15 | DIRECT REFERENCE |
| | P13, P15 | INTERNAL DIVISION OF 1:1 |

MAP

| P0  | Q33 | P2  | Q34 | P7  | Q38 | P15 |
|-----|-----|-----|-----|-----|-----|-----|
| Q35 | P5  | Q36 | P10 | Q40 |     |     |
| P8  | Q37 | P13 |     |     |     |     |
| Q39 |     |     |     |     |     |     |

(Grid 4×4 order: row1: P0, Q34, P7, P15; row2: Q35, P5, Q38, ... )

BIT ALLOCATION INFORMATION

| PIXEL | ALLOCATION BIT |
|---|---|
| P0, P2, P5, P7, P8, P10, P13, P15 | 22 bit |
| Q33 TO Q40 | 2 bit |

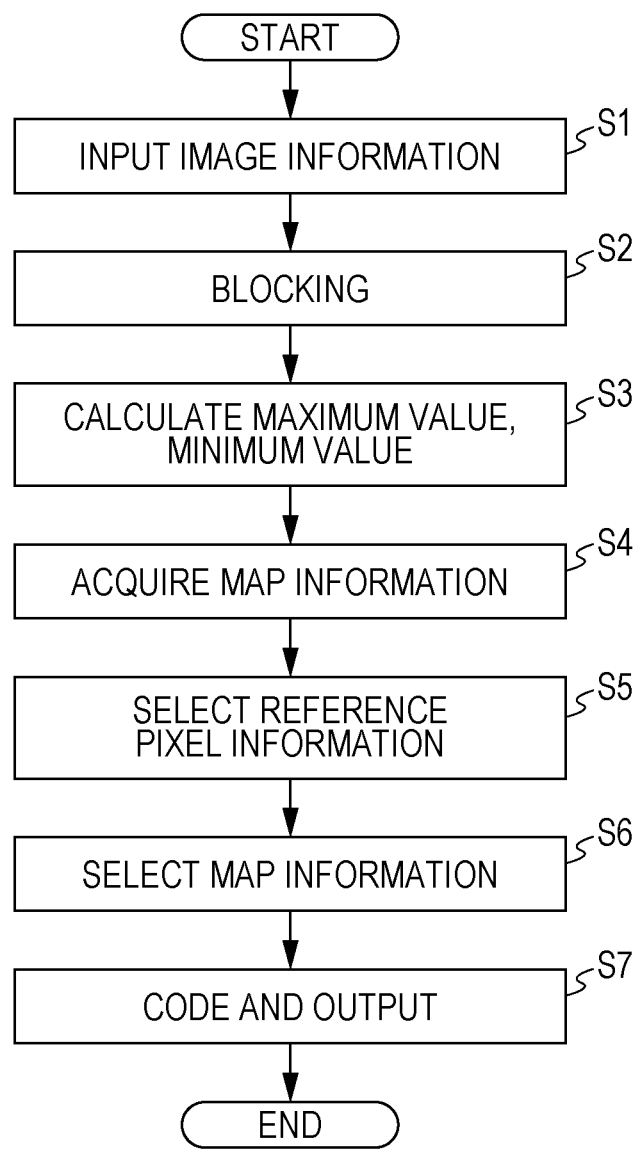

IMAGE PROCESSING APPARATUS, IMAGE PROCESSING METHOD, AND IMAGE PROCESSING PROGRAM

BACKGROUND

1. Field

The present disclosure relates to an image processing apparatus, an image processing method, and an image processing program.

2. Description of the Related Art

As a technique for coding images, S3 Texture Compression (S3TC) (also referred to as DXTC) as a texture coding technique for 3DCG is known as disclosed in Japanese Unexamined Patent Application Publication (Translation of PCT Application) No. 2001-519608. Here, in the S3TC, image information is divided into blocks each including 4×4 pixels. Next, two representative colors are configured for each block, two neutral colors are configured between the representative colors, and each pixel is replaced with these four colors (replacement image). Specifically, pieces of index information each denoting a color of the four colors which is used are stored. With this configuration, the representative colors and the index information are retained for each block, which enables reproduction of the replacement image. In this way, it is possible to compress the image information.

Some images, however, may result in an increased degree of degradation when decoded. In view of the foregoing, an aspect of the present disclosure is to realize an image processing apparatus configured to further reduce degradation of an image when the image is decoded as compared to the related art.

SUMMARY

An image processing apparatus of the present disclosure includes: a blocking unit configured to divide image information into a plurality of blocks; a map information acquisition unit configured to acquire at least one piece of map information in which a plurality of pieces of reference pixel information and a plurality of pieces of positional information are associated with a target pixel in each of the blocks, each of the plurality of pieces of reference pixel information denoting at least one reference pixel referenced by the target pixel, each of the pieces of positional information denoting a positional relationship between the target pixel and the at least one reference pixel; and a reference pixel information selecting unit configured to select one piece of reference pixel information of the plurality of pieces of reference pixel information included in the at least one piece of map information based on a pixel value of the target pixel and a pixel value of the at least one reference pixel.

An image processing method of the present disclosure includes: dividing image information into a plurality of blocks; acquiring at least one piece of map information in which a plurality of pieces of reference pixel information and a plurality of pieces of positional information are associated with a target pixel in each of the blocks, each of the plurality of pieces of reference pixel information denoting at least one reference pixel referenced by the target pixel, each of the pieces of positional information denoting a positional relationship between the target pixel and the at least one reference pixel; and selecting one piece of reference pixel information of the plurality of reference pixel information included in the at least one piece of map information based on a pixel value of the target pixel and a pixel value of the at least one reference pixel.

An image processing program of the present disclosure causes a computer to function as: a blocking unit configured to divide image information into a plurality of blocks; a map information acquisition unit configured to acquire at least one piece of map information in which a plurality of pieces of reference pixel information and a plurality of pieces of positional information are associated with a target pixel in each of the blocks, each of the plurality of pieces of reference pixel information denoting at least one reference pixel referenced by the target pixel, each of the pieces of positional information denoting a positional relationship between the target pixel and the at least one reference pixel; and a reference pixel information selecting unit configured to select one piece of reference pixel information of the plurality of pieces of reference pixel information included in the at least one piece of map information based on a pixel value of the target pixel and a pixel value of the at least one reference pixel.

BRIEF DESCRIPTION OF THE DRAWINGS

FIG. 4A is a view illustrating an example of map information;

FIG. 4B is a view illustrating another example of the map information;

FIG. 4C is a view illustrating another example of the map information;

FIG. 4D is a view illustrating another example of the map information;

FIG. 4E is a view illustrating another example of the map information;

FIG. 4F is a view illustrating another example of the map information;

FIG. 4G is a view illustrating another example of the map information;

FIG. 4H is a view illustrating another example of the map information; and

FIG. 5 is a view illustrating an example of a flow of the embodiment of the present disclosure.

DESCRIPTION OF THE EMBODIMENTS

Figure 1:
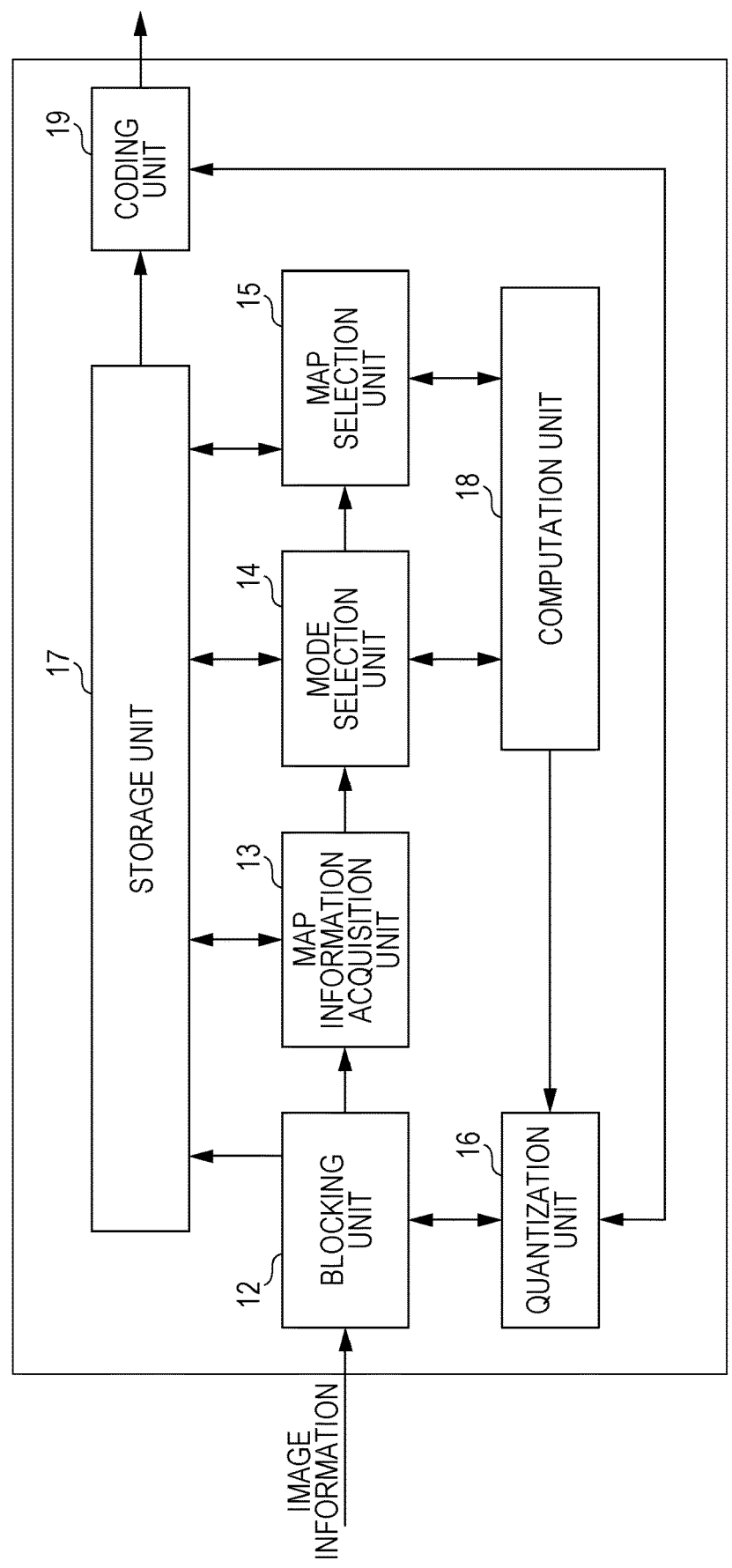
FIG. 1 is a view illustrating a configuration of an image processing apparatus according to an embodiment of the present disclosure.

A preferable embodiment of the present disclosure will be described in detail below with reference to the drawings. The dimensions, materials, the specific numerical values, and the like described in the embodiment are mere examples for facilitating understanding of the present disclosure and are not intended to limit the disclosure unless otherwise noted. Note that in the specification and the drawings, elements having substantially the same functions and configurations are denoted by the same reference signs to omit redundant description, and elements having no direct relationship with the present disclosure will be omitted in the drawings.

FIG. 1 is a view illustrating an example of a configuration of an image processing apparatus according to the present disclosure. As illustrated in FIG. 1, an image processing apparatus 11 according to the present disclosure functionally includes, for example, a blocking unit 12, a map information acquisition unit 13, a reference pixel information selecting unit 14, a map selecting unit 15, a quantization unit 16, a storage unit 17, a computation unit 18, and a coding unit 19.

The image processing apparatus 11 further includes, for example, a control unit as a hardware component including a CPU, an MPU, and the like and operates in accordance with a program stored in the storage unit 17. Note that the configuration described above is a mere example, and, for example, an LSI may hold map information (reference pixel information, information regarding a positional relationship, bit allocation information, mode information, and the like) as illustrated in FIG. 4B which will be described later. The control unit realizes the blocking unit 12, the map information acquisition unit 13, the reference pixel information selecting unit 14, the map selecting unit 15, the quantization unit 16, the computation unit 18, and the coding unit 19. The storage unit 17 includes, for example, an information recording medium such as ROM and RAM and is an information recording medium which holds a program to be executed by the control unit. Moreover, the storage unit 17 also operates as a work memory of the control unit. Note that the program may be provided, for example, by being downloaded over a network, or provided as a various types of computer-readable information recording media such as CD-ROM, DVD-ROM, and semiconductor memory.

Figures 2, 3:
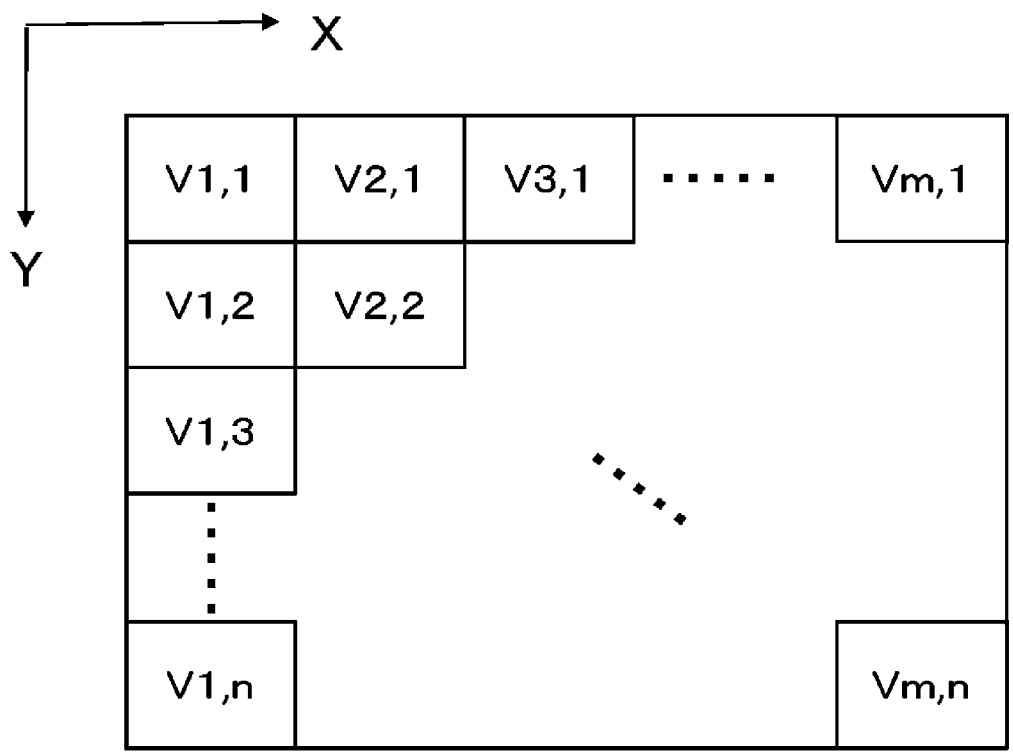
FIG. 2 is a view illustrating an example of image information input.
FIG. 3 is a view illustrating an example of a configuration of a block after blocking.

In this embodiment, image information input to the image processing apparatus 11 includes, as illustrated in, for example, FIG. 2, pieces of image information Vmn, wherein m pieces of pixel information are aligned in the horizontal direction X (the left-right direction in the figure), and n pieces of pixel information are aligned in the vertical direction Y (the up-down direction in the figure) (m and n are natural numbers). The image information further includes, for example, RGB colors. Note that the image information may be formed of image information in a different format such as YUV other than RGB, but RGB will be described an example below.

The blocking unit 12 divides the image information received into a plurality of blocks each including sixteen pixels P0 to P15 in 4×4 rows as illustrated in, for example, FIG. 3. Each block is not particularly limited to that including the pixels in the 4×4 rows as long as it includes a plurality of pixels.

The quantization unit 16 quantizes a pixel value of each of the pixels in the blocks to generate quantized blocks. The quantized blocks are stored in the storage unit 17.

The quantization unit 16 computes a maximum value and a minimum value of each of the RGB colors of the image information as representative values, for example, based on the pixel values of the pixels in the blocks. Then, the quantization unit 16 quantizes the pixel value of each of the pixels in the blocks by replacing values between the maximum value and the minimum value with a plurality of intermediate values each represented by a prescribed bit width (for example, 12 bits). The blocks and the quantized blocks are stored in the storage unit 17. In the above description, the maximum value and the minimum value are defined as the representative values but are not limited to this embodiment.

The map information acquisition unit 13 acquires map information in which a plurality of pieces of reference pixel information are associated with a plurality of pieces of positional information. The plurality of pieces of reference pixel information denote reference pixels referenced by a target pixel. Each of the pieces of positional information denotes a positional relationship between the target pixel and each of the reference pixels. Specific description will be given with reference to the map information shown in FIG. 4B. In FIG. 4B, target pixels Q1 to Q4 are shown. As shown on the right in FIG. 4B, reference pixels P1, P4, P1 and P13, and P4 and P7 are associated, as the plurality of pieces of reference pixel information, with the target pixel Q1. Moreover, a positional relationship of each of the reference pixels associated to the target pixel is also shown on the left in FIG. 4B. Moreover, as shown on the right in FIG. 4B, mode information denoting direct reference of the reference pixel, performing of internal division of 1:2, or the like is associated with each of the plurality of pieces of reference pixel information (P1, P4, P1 and P13, and P4 and P7 for the target pixel Q1). Note that the direct reference, the internal division, and the like will be described in detail later. Moreover, in the map information, the bit width of each target pixel and the bit width of each of pixels other than the target pixels are associated with each other. Note that the map information is a mere example, and the map information is not limited to the above-described configuration.

Moreover, in the related art, each of pieces of map information is configured in advance for an image which results in a high degree of deterioration when the image is decoded. Specifically, for example, map information denoted by code 6 or code 7 is capable of reducing the degree of deterioration of an image when the image is decoded, when colors of pixels in the block continuously changes in a gradation manner.

The reference pixel information selecting unit 14 selects one piece of reference pixel information based on the pixel value of the target pixel and the pixel value of the reference pixel. Specifically, an example of the target pixel Q1 will be described. As described above, P1, P4, P1 and P13, and P4 and P7 are associated with the target pixel Q1, and therefore, a candidate pixel value of each of the reference pixels is obtained. More specifically, for example, "direct reference" as the mode information is associated with the reference pixel information in the first row in FIG. 4B, and therefore, the candidate pixel value is the pixel value of P1. Similarly, the reference pixel value in the second row is the pixel value of P4. On the other hand, since P1 and P13 are associated as pieces of reference pixel information in the third row, the candidate pixel information is obtained in accordance with the distance between the target pixel Q1 and each of the reference pixels P1 and P13. Specifically, since a ratio of the distance between Q1 and P1 to the distance between Q1 and P13 is 1:2, the candidate pixel information of Q1 is obtained based on: (pixel value of P1)×⅔+(pixel value of P13)×⅓. For the reference pixel value in the fourth row, P4 and P7 are associated as pieces of reference pixel information, and therefore, the reference pixel value is obtained, in a similar manner to the reference pixel information in the third row, based on: (pixel value of P4)×⅔+(pixel value of P7)×⅓. When a formula for computing the reference pixel value is expressed in a mathematical formula, the internal division value in accordance with the distance between Q1 and P1 and the distance between Q1 and P13 is expressed in the following formula.

$$\text{REFERENCE PIXEL VALUE} = \frac{\left(\begin{array}{c}\text{DISTANCE}\\\text{BETWEEN}\\Q1\text{ AND }P13\end{array}\right)\times\begin{array}{c}\text{PIXEL}\\\text{VALUE OF}\\P1\end{array}+\left(\begin{array}{c}\text{DISTANCE}\\\text{BETWEEN}\\Q1\text{ AND }P1\end{array}\right)\times\begin{array}{c}\text{PIXEL}\\\text{VALUE OF}\\P13\end{array}}{\left(\begin{array}{c}\text{DISTANCE}\\\text{BETWEEN}\\Q1\text{ AND }P1\end{array}\right)+\left(\begin{array}{c}\text{DISTANCE}\\\text{BETWEEN}\\Q1\text{ AND }P13\end{array}\right)}$$

Note that the method of obtaining the reference pixel value is a mere example and is not limited to this embodiment.

The reference pixel information selecting unit 14 further causes the computation unit 18 to calculate the difference between each of the target pixel values and the above reference pixel value, and the reference pixel information selecting unit 14 selects, as the reference pixel information, a reference pixel corresponding to a reference pixel value having a minimum difference. This embodiment describes an example in which the differences are computed for selection, but this embodiment is not to be construed as limiting. Any method may be adopted as long as the method reduces errors between the pixel value of the target pixel and the reference pixel value. For example, the difference value may be computed based on an approximated difference value.

The reference pixel information selecting unit 14 selects one piece of reference pixel information for each of the target pixels Q2 to Q4 shown in FIG. 4B in a similar manner. Note that since processes similar to the above-described process are performed also in a case where pieces of map information shown in FIGS. 4B to 4H are acquired, the description thereof will be omitted.

The map selecting unit 15 selects one piece of map information of the plurality of pieces of map information based on a pre-replacement block and a replacement block obtained by replacement with a pixel value computed based on the reference pixel information selected by the reference pixel information selecting unit 14 for each of the pieces of map information. The map selecting unit 15 replaces, based on map information including respective pieces of reference pixel information of the target pixels, respective reference pixels corresponding to the target pixels with reference pixel values obtained to acquire the replacement block. The map selecting unit 15 causes the computation unit 18 to compute the difference between the replacement block obtained and the pre-replacement block and selects map information corresponding to a minimum difference. A method for calculating the difference may calculate a direct difference or calculate a difference of an approximate value and is not particularly limited. This embodiment describes an example in which differences are computed for selection, but the method for selecting the map information is not limited to this embodiment, and any method may be used as long as the method reduces errors between the replacement block and the pre-replacement block.

The coding unit 19 outputs, as coding information, for example, data obtained by quantizing the selected map information (for example, code 1), data obtained by quantizing reference pixel information (for example, information representing P1 as the reference pixel of Q1) corresponding to the selected map information, data obtained by quantizing a pixel value (for example, P0) other than the target pixel, and data obtained by quantizing the maximum value and the minimum value. In this embodiment, as described above, bit allocation information is associated with the map information, and therefore, in accordance with, for example, the map information, the quantization unit 16 quantizes pixel values other than the reference pixel information and the target pixel. Note that in accordance with the order included in the data of the maximum value and the minimum value, it may be determined whether data is based on RGB or YUV.

The image processing apparatus according to the present disclosure may further include a decoding unit (not shown) and may be configured to decode coded information by the decoding unit to generate image data decoded.

Moreover, the image processing apparatus 11 may further include a single-color determination unit configured to determine whether or not the image information is configured with a single color. In this case, the single-color determination unit determines whether or not all the pixels in the block are expressed in a single color. When it is determined that each pixel in the block has a single color, the maximum value/minimum value, which each of RGB colors independently has, may be made common to assign redundant bits to the bit width when quantization is performed. For example, processing is performed based on map information of code 0 as illustrated in FIG. 4A. As illustrated in FIG. 4A, since the map information has no reference pixel, the information of the block is used as is when coding is performed. For example, a block is used in which a bit width of 12 bits is assigned to each of pixels P0 to P15 in the block shown in FIG. 4A. Note that also in this case, the processing may be performed based on map information shown in each of FIGS. 4B to 4H. Moreover, in the case of the single color, it is possible to perform expression in one color, and therefore, the bit width does not have to be assigned to other colors. Thus, redundant bit widths may be further assigned to the single color. Moreover, for example, also when values of pixels are the same in R and G and B or in R and G within a prescribed range, it is possible to treat the image information in a similar manner as in the case of the single color. The combination is not limited to this embodiment. When the single-color determination unit is provided, an additional bit for determining whether or not the block is in a single color is added to the code data to enable the determination when decoding is performed.

An example of the flow of the image processing performed by the image processing apparatus 11 according to the present embodiment will be described below with reference to a flow diagram shown in FIG. 5.

As illustrated in FIG. 5, image information is input to the image processing apparatus 11 (S1). The blocking unit 12 divides the image information received into a plurality of blocks each including sixteen pixels P0 to P15 in 4×4 rows (S2). Based on the pixel values of the pixels in each blocks, a maximum value and a minimum value of each of RGB colors of the image information are computed as representative values (S3).

The map information acquisition unit 13 acquires map information in which a plurality of pieces of reference pixel information are associated with a plurality of pieces of positional information (S4). Each of the plurality of pieces of reference pixel information denotes at least one reference pixel referenced by a target pixel. Each of the pieces of positional information denotes a positional relationship between the target pixel and the at least one reference pixel. The reference pixel information selecting unit 14 further causes the computation unit 18 to calculate the difference between each of the target pixel values and the above reference pixel value, and the reference pixel information selecting unit 14 selects, as the reference pixel information, a reference pixel corresponding to a reference pixel value having a minimum difference (S5). The process is performed on each piece of map information.

The map selecting unit 15 selects one piece of map information of the plurality of pieces of map information based on a pre-replacement block and a replacement block obtained by replacement with a pixel value computed based on the reference pixel information selected by the reference pixel information selecting unit 14 (S6).

The coding unit 19 outputs, as coding information, for example, data obtained by quantizing the selected map information (for example, code 1), data obtained by quantizing reference pixel information (for example, information representing P1 as the reference pixel of Q1) corresponding to the selected map information, data obtained by quantizing a pixel value (for example, P0) other than the target pixel, and data obtained by quantizing the maximum value and the minimum value (S7).

The embodiment described above enables a further reduction in degradation of an image when the image is decoded as compared to the related art.

For example, in the embodiment, bit distribution ($b1 \leq b2 \leq b3$) of each color (RGB or YUV) may be further determined based on, for example, the number of total bits and a ratio of the difference between the maximum value and the minimum value of each color (range ratio, $r1 \leq r2 \leq r3$), and the bits may be distributed. In this case, for example, as illustrated in the table below, bit distribution information is acquired. The bit distribution information represents the relationship between the range ratio and the bit distribution configured for each code in advance. Based on the bit distribution information, bit distribution is determined for each color. Note that the table below is an example of a part of the bit distribution information. More specifically, for example, in the case of code 1, when the range ratio (r1, r2, r3) of the pixel information is (2, 5, 4096), bit distribution information is (2, 4, 4096), and 5 corresponding to r2 is larger than or equal to 4 corresponding to r2 of the bit distribution information, and therefore, based on the bit distribution information in the first row in the following table, the bit distribution of (b1, b2, b3) is, for example, (1, 2, 12). Note that the bit distribution information shown below is a mere example and is not limited to the following information. For example, the bit distribution information may be configured for each of the codes or each group (e.g., codes 1 to 4) of the codes in advance. Thus, largest ranges which can be expressed by a bit count can be further equalized. Note that, for example, 1 may be added to each range so that the range (e.g., r1) is not 0. Moreover, Y may be configured to be weighted by a factor of three to increase weight. Moreover, 1 may be added to G to break tie. Note that in the above description, as an example, the ratio of the difference between the maximum value and the minimum value is used, but this does not limit the disclosure.

TABLE 1

| . | . | . | | | |
|---|---|---|---|---|---|
| 2 | 4 | 4096 | 1 | 2 | 12 |
| 2 | 8 | 2048 | 1 | 3 | 11 |
| . | . | . | | | |

The present disclosure is not limited to the above embodiment, and the configuration shown in the above embodiment may be replaced with the one that is substantially identical, that provides the identical effect, or that achieves the same purpose. Note that, for example, the image processing apparatus is applied when image information in 8K television system is coded and/or decoded.

The present disclosure contains subject matter related to that disclosed in Japanese Priority Patent Application JP 2018-033045 filed in the Japan Patent Office on Feb. 27, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   one or more non-transitory computer-readable media having computer-executable instructions embodied thereon; and
   at least one controller coupled to the one or more non-transitory computer-readable media, and configured to execute the computer-executable instructions to:
   divide image information into a plurality of blocks;
   acquire at least one piece of map information in which a plurality of pieces of reference pixel information and a plurality of pieces of positional information are associated with each of a plurality of target pixels corresponding to some of pixels in each of the blocks, each of the plurality of pieces of reference pixel information indicating which pixel is at least one reference pixel referenced by each of the plurality of target pixels, each of the pieces of positional information denoting a positional relationship between each of the plurality of target pixels and the at least one reference pixel; and
   select, for each of the plurality of target pixels, one piece of reference pixel information of the plurality of pieces of reference pixel information included in the at least one piece of map information based on a pixel value of each of the plurality of target pixels and a pixel value of the at least one reference pixel.

2. The image processing apparatus according to claim 1, wherein
   the one piece of reference pixel information is selected based on a difference between a pixel value computed based on the pixel value of the at least one reference pixel and the pixel value of each of the plurality of target pixels.

3. The image processing apparatus according to claim 1, wherein
   the at least one reference pixel referenced by each of the plurality of target pixels includes a plurality of reference pixels.

4. The image processing apparatus according to claim 3, wherein
   as the pixel value computed based on the pixel value of the at least one reference pixel, a pixel value of each of the plurality of reference pixels is computed based on a distance between each of the plurality of reference pixels and each of the plurality of target pixels.

5. The image processing apparatus according to claim 1, wherein
   the at least one piece of map information includes a plurality of pieces of map information, the at least one controller is further configured to execute the computer-executable instructions to: select one piece of map information of the plurality of pieces of map information based on a pre-replacement block and a replacement block obtained by replacement with a pixel value computed based on the reference pixel information.

6. The image processing apparatus according to claim 1, wherein
the at least one controller is further configured to execute the computer-executable instructions to determine, based on a range ratio based on a first value and a second value of each of colors of each of the pixels, bit distribution of each of the colors and perform bit distribution for each of the colors.

7. The image processing apparatus according to claim 1, wherein
the one piece of reference pixel information is selected from the plurality of pieces of reference pixel information for each of the plurality of target pixels, the plurality of pieces of reference pixel information being included in the at least one piece of map information, the one piece of reference pixel information selected having a minimum difference between a pixel value computed based on the pixel value of the at least one reference pixel and the pixel value of each of the plurality of target pixels.

8. An image processing apparatus comprising:
one or more non-transitory computer-readable media having computer-executable instructions embodied thereon; and
at least one controller coupled to the one or more non-transitory computer-readable media, and configured to execute the computer-executable instructions to:
divide image information into a plurality of blocks;
acquire at least one piece of map information in which a plurality of pieces of reference pixel information and a plurality of pieces of positional information are associated with a target pixel in each of the blocks, each of the plurality of pieces of reference pixel information denoting at least one reference pixel referenced by the target pixel, each of the pieces of positional information denoting a positional relationship between the target pixel and the at least one reference pixel; and
select one piece of reference pixel information of the plurality of pieces of reference pixel information included in the at least one piece of map information based on a pixel value of the target pixel and a pixel value of the at least one reference pixel, wherein
the at least one piece of map information includes a plurality of pieces of map information,
the at least one controller is further configured to execute the computer-executable instructions to select one piece of map information of the plurality of pieces of map information based on a pre-replacement block and a replacement block obtained by replacement with a pixel value computed based on the reference pixel information,
each of the plurality of pieces of map information includes bit width information representing a bit width for quantizing a pixel value of a pixel other than the target pixel, and
the at least one controller is further configured to execute the computer-executable instructions to quantize each block based on the map information selected.

9. The image processing apparatus according to claim 8, wherein
the bit width information varies depending on a number of the target pixels included in each of the plurality of pieces of map information.

10. The image processing apparatus according to claim 9, wherein
the at least one controller is further configured to execute the computer-executable instructions to perform quantization based on a first value and a second value of pixel values of pixels in each block.

11. The image processing apparatus according to claim 10, wherein
the first value is a maximum value of the pixel values of the pixels in each block, and the second value is a minimum value of the pixel values of the pixels in each block.

12. An image processing method comprising:
dividing image information into a plurality of blocks;
acquiring at least one piece of map information in which a plurality of pieces of reference pixel information and a plurality of pieces of positional information are associated with a target pixel in each of the blocks, each of the plurality of pieces of reference pixel information denoting at least one reference pixel referenced by the target pixel, each of the pieces of positional information denoting a positional relationship between the target pixel and the at least one reference pixel;
selecting one piece of reference pixel information of the plurality of pieces of reference pixel information included in the at least one piece of map information based on a pixel value of the target pixel and a pixel value of the at least one reference pixel,
acquiring the at least one piece of map information including a plurality of pieces of map information,
selecting one piece of map information of the plurality of pieces of map information based on a pre-replacement block and a replacement block obtained by replacement with a pixel value computed based on the reference pixel information, and
quantizing each block based on the map information selected, wherein
each of the plurality of pieces of map information includes bit width information representing a bit width for quantizing a pixel value of a pixel other than the target pixel.

13. The image processing method according to claim 12, wherein
in the at least one piece of map information, the plurality of pieces of reference pixel information and the plurality of pieces of positional information are associated with each of a plurality of target pixels corresponding to some of pixels in each of the blocks, each of the plurality of pieces of reference pixel information indicating which pixel is at least one reference pixel referenced by each of the plurality of target pixels, each of the pieces of positional information denoting a positional relationship between each of the plurality of target pixels and the at least one reference pixel; and
for each of the plurality of target pixels, one piece of reference pixel information of the plurality of pieces of reference pixel information included in the at least one piece of map information is selected based on a pixel value of each of the plurality of target pixels and a pixel value of the at least one reference pixel.

14. The image processing method according to claim 13, wherein
   selecting the one piece of reference pixel information from the plurality of pieces of reference pixel information for each of the plurality of target pixels, the plurality of pieces of reference pixel information being included in the at least one piece of map information, the one piece of reference pixel information selected having a minimum difference between a pixel value computed based on the pixel value of the at least one reference pixel and the pixel value of each of the plurality of target pixels.

15. The image processing method according to claim 12, further comprising
   determining, based on a range ratio based on a first value and a second value of each of colors of each of the pixels, bit distribution of each of the colors and performing bit distribution for each of the colors.

\* \* \* \* \*